United States Patent Office 2,754,736
Patented July 17, 1956

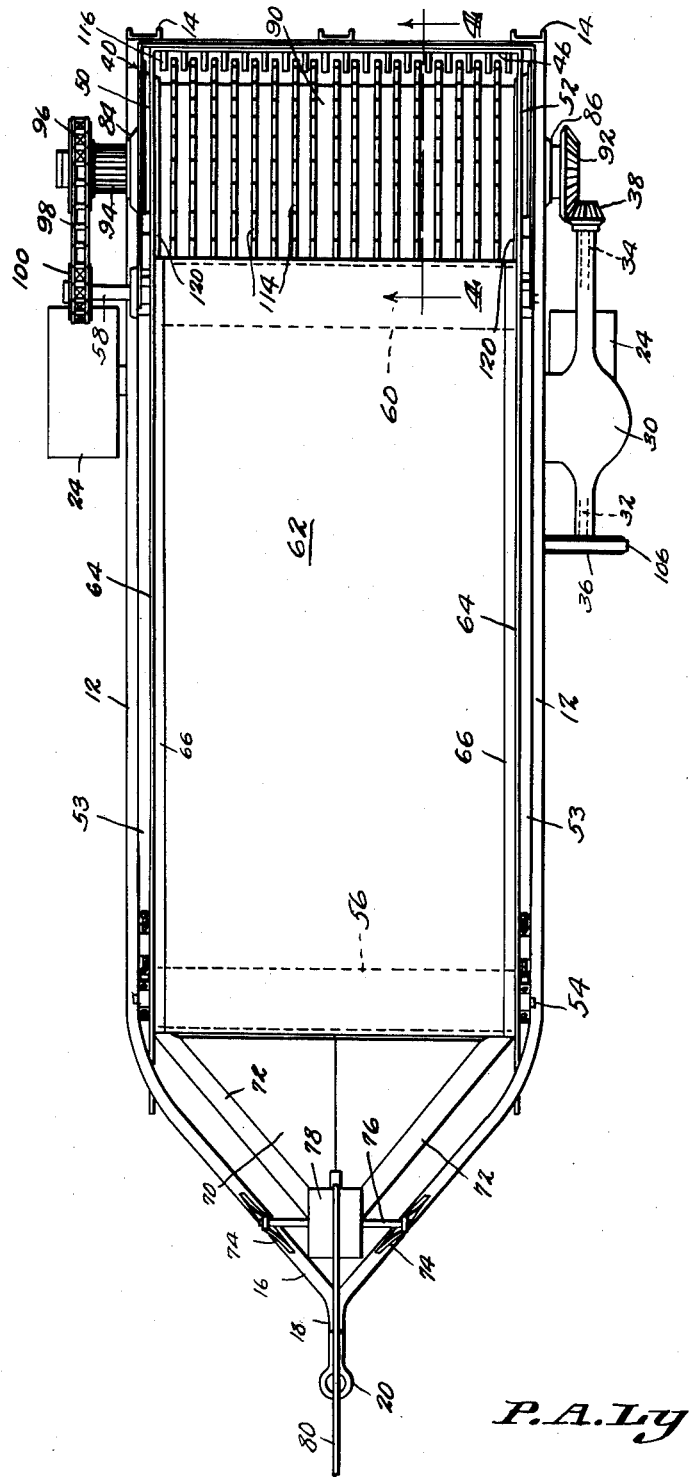

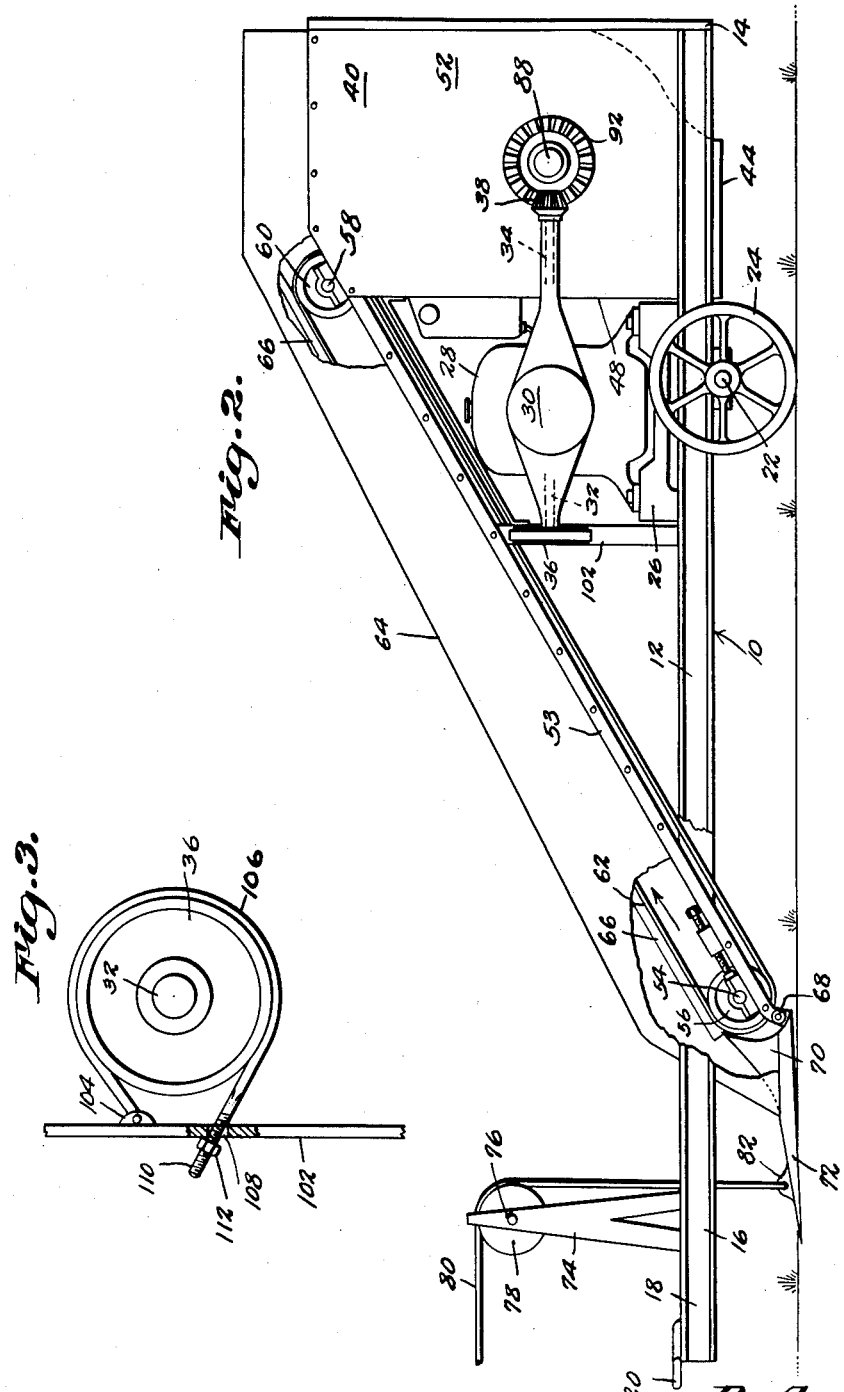

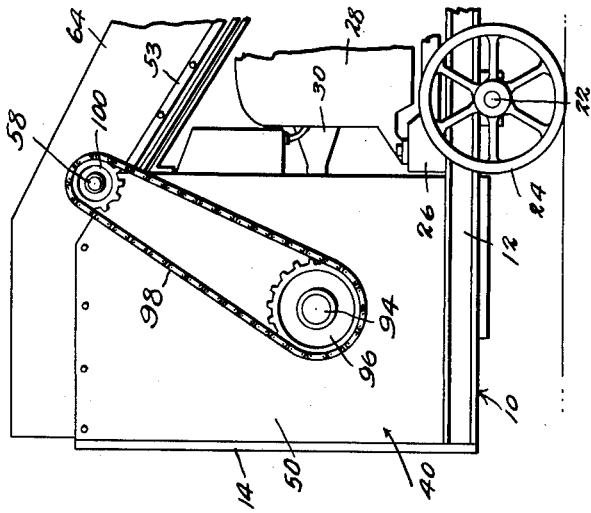
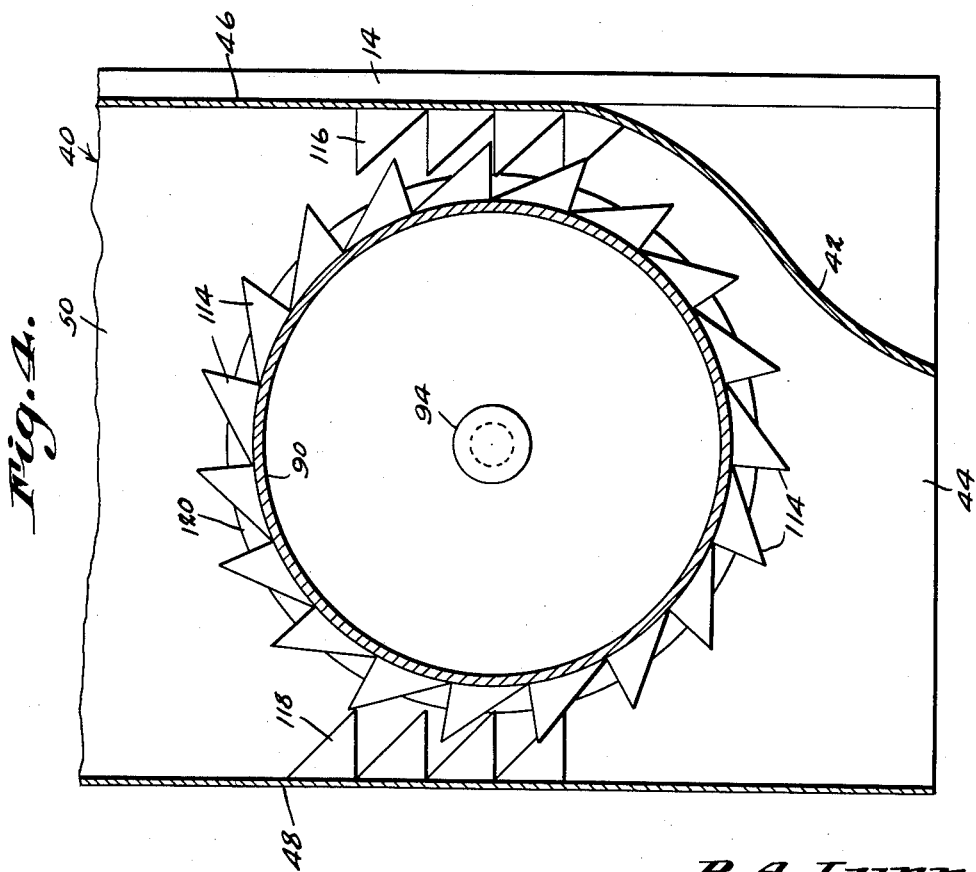

2,754,736

TRACTOR DRAWN WHEELED IMPLEMENT
FOR DESTROYING WILD GROWTH

Patrick A. Lynn, Tampa, Fla.

Application December 3, 1951, Serial No. 259,561

2 Claims. (Cl. 97—10)

This invention relates to a tractor drawn wheeled implement for destroying wild growth and has for its primary object to sever growing plants from the roots thereof beneath the surface of the ground and to subsequently grind to bits the severed plants and to return the ground plants to the soil in an inert condition.

Another object is to rapidly destroy palmetto plants and the like and to protect the elements of the machine with which the plants come in contact from injury through contact with the soil and sand in which plants of the palmetto type grow.

The above and other objects may be attained by employing this invention which embodies among its features a cutting blade adapted to be advanced beneath the surface of the ground for severing from their roots the plants to be destroyed, a hopper carried by the implement to the rear of the cutting blade, an elevator carried by the implement and extending between the cutting blade and the hopper for receiving the severed plants and discharging them into the hopper, a drum mounted in the hopper for rotation about an axis which lies perpendicular to the path along which the blade is advanced, longitudinally spaced rows of cutting teeth carried by the drum and projecting outwardly from the periphery thereof and spaced rows of cutting teeth carried by the hopper and projecting thereinto between the rows of teeth on the drum for cooperating with the teeth on the drum in grinding the plants and rendering the ground particles inert.

Other features include a funnel on the hopper for discharging the ground plants and distributing them on the soil as fertilizer, a prime mover carried by the implement and connected to the drum and to the elevator for operating the drum and elevator in unison.

Other features include a brake carried by the driving means between the prime mover and the drum and connected to said driving means to arrest the rotation thereof until such time as the resistance to turning of the drum attains a predetermined value.

In the drawings,

Fig. 1 is a plan view of an implement embodying the features of this invention,

Fig. 2 is a side view of the implement illustrated in Fig. 1, certain portions of said implement being broken away more clearly to illustrate certain details of construction, Fig. 3 is a fragmentary enlarged detail view of the brake and band therefor, Fig. 4 is a fragmentary enlarged detail view taken substantially along the line 4—4 of Fig. 1, and Fig. 5 is a fragmentary side view of the machine taken from the side opposite that illustrated in Fig. 2.

Referring to the drawings in detail an elongated bed frame designated generally 10 comprises a pair of spaced parallel side bars 12 and carried by and extending upwardly from the side bars 12 at the rear end of the implement are vertical posts 14. The ends of the side bars 12 remote from the posts 14 converge as at 16 to form a draft tongue 18 carrying an eye 20 which is adapted to be coupled to a conventional traction vehicle preferably of the type commonly referred to as a crawler. Carried by and extending transversely of the side bars 12 near the end thereof remote from the converging ends 16 of the side bars is an axle 22, and mounted for rotation on the axle adjacent opposite side bars 12 are ground wheels 24 which serve to support the rear end of the implement for mobility above the ground.

Secured to the bed frame 10 above the axle 22 is a motor mount 26 upon which a prime mover 28 which in the present disclosure is depicted as a conventional internal combustion engine is mounted. The drive shaft of the prime mover 28 extends transversely of the bed frame 10 in substantially parallel relation to the axle 22 and coupled to the drive shaft of the prime mover preferably through a multi-speed transmission (not shown) is a conventional differential gear housed within a differential housing 30 having oppositely extending horizontally disposed driven shafts 32 and 34 which align axially and lie substantially parallel to the longitudinal axis of the implement. A brake drum 36 is carried by the shaft 32 for rotation therewith, and carried by the shaft 34 for rotation therewith is a bevel pinion 38 the purpose of which will hereinafter appear. Carried by the frame 10 and extending upwardly therefrom between the uprights or standards 14 and the motor mount 26 is a hopper 40 having an open upper end and an inwardly offset rear wall 42 forming at the lower end of the hopper a discharge funnel 44. The inwardly offset portion 42 of the hopper 40 merges at its upper edge into a vertical rear wall 46, and carried by the frame adjacent the motor mount 26 is the vertically extending front wall 48 of the hopper 40. Opposite ends of the hopper are closed by end walls 50 and 52 while the upper end of the hopper is wholly open.

Secured to and extending downwardly from the upper forward corners of the end walls 50 and 52 of the hopper are spaced parallel inclined elevator supporting rails 53 which lie between the side bars 12 and are coupled adjacent their lower forward ends to opposite side bars. Mounted for longitudinal adjustment adjacent the lower ends of the side rails 53 is a transversely extending shaft 54 on which is mounted for rotation an idler roller 56. A drive shaft 58 is mounted on the rails 53 adjacent their upper ends and carried by the drive shaft for rotation therewith is a drive pulley 60. An endless conveyor belt 62 is trained over the idler roller 56 and the drive roller 60 so that when the drive roller 60 is operated, the upper run of the belt will move upwardly and rearwardly of the frame 10 so that objects deposited on the upper run of the belt 62 will be discharged therefrom into the hopper 40. Upwardly extending guard plates 64 are carried by opposite rails 53 and carried by the guard plates 64 above the upper run of the belt 62 and extending inwardly and overlying opposite side edges of said belt are inwardly and downwardly inclined guards 66 which serve to prevent earth and sand carried by the plants to be destroyed from injuring the bearings in which the shafts 54 and 58 are mounted.

Pivotally coupled as at 68 to the lower forward ends of the rails 53 are opposite ends of a forwardly extending substantially triangular plow 70 having its apex disposed below the convergent ends of the side bars 12 and its base substantially parallel with the idler roller 56. Carried by and extending along the convergent forwardly projecting side edges of the plow 70 are convergent cutting blades 72 which are adapted to advance with the implement and operate below the surface of the ground to sever the plants from their roots. Carried by and extending upwardly from the convergent ends of the side bars 12 adjacent the draft tongue 18 are stands 74 in which a horizontally extending shaft 76 is mounted. This shaft lies substantially parallel to the axle 22 and carries a sheave 78 over which is trained a cable 80, one end of which is coupled to the power take-off of the traction vehicle while the opposite end of the cable 80 is coupled to an eye 82 carried by the plow 70 adjacent the forward end thereof. It will thus be seen that by operating the power take-off of the traction vehicle, the depth at which the plow 70 and blades 72 operate may be regulated.

Carried by opposite end walls 50 and 52 of the hopper 40 are bearings 84 and 86 respectively and mounted for rotation in the bearing 86 is a trunnion 88 which extends through the wall 52 and is rigidly connected to a relatively large drum 90 which is located within the hopper 40. A bevel gear 92 is carried by the trunnion 88 and has meshing engagement with the bevel pinion 38 previously referred to so that when the shaft 34 of the differential contained within the housing 30 is rotated, the drum 90 will rotate in unison therewith. A trunnion 94 is mounted for rotation in the bearing 84 and extends through the wall 50 of the hopper 40 in axial alignment with the trunnion 88 and is fixed to the drum 90 for rotation in unison therewith. A sprocket 96 is carried by the trunnion 94 for rotation therewith and has driving connection through the medium of a conventional endless chain 98 with a sprocket 100 which is mounted on the drive shaft 58 of the drive roller 60. It will thus be seen that when the drum 90 is rotated, the drive roller 60 will rotate in unison therewith.

Carried by and extending vertically from the side bar 12 of the bed frame 10 adjacent the differential housing 30 is a standard 102 which lies directly behind the drum 36, and pivotally coupled to the standard 102 as at 104 is one end of a brake band 106 which extends around the drum 36 and has its opposite end projected through an opening 108 in the standard. The end of the band 106 which projects through the standard 102 is externally screw threaded as at 110, and threadedly engaging said band and bearing against the standard 102 is a nut 112 by means of which the band 106 may be tightened about the drum 36. As a consequence of tightening the band 106, rotation of the drum 36 will be arrested thus causing the power transmitted by the prime mover 28 through the differential within the housing 30 to be absorbed by the drum 90 through the medium of the pinion 38 and bevel gear 92. Hence should the resistance of the drum to turning attain a predetermined value, at which rotation of the drum is arrested, the energy of the prime mover 28 will be absorbed by the rotation of the brake drum 36 against the band 106.

Carried by the drum and extending outwardly from the periphery thereof are longitudinally spaced outwardly extending rows of cutting teeth 114 and carried by the rear wall 46 of the hopper 40 are longitudinally spaced vertical rows of cutting teeth 116. The rows of teeth 114 and 116 are so arranged that as the teeth 114 move with the drum 90, they will pass between the rows of teeth 116 so that the substances deposited upon the drum by the conveyor belt 62 will be ground to bits by the teeth 114 and 116. Carried by the wall 48 and extending toward the drum 90 are spaced vertical rows of cleaning teeth 118 which like the teeth 116 extend toward the drum between the rows of teeth 114 so that as the drum rotates, any particles carried by the teeth 114 beyond the discharge funnel 44 will be stripped from the teeth 114 and caused to fall through the discharge funnel. An annular sand and dirt guard 120 is carried by each wall 50 and 52 and overlies an adjacent end of the drum so that any soil or sand that may find its way into the hopper will be directed away from the bearings 84 and 86.

In use, the plow 70 is adjusted by the cable 80 to the desired angle at which the blades 72 are to operate beneath the surface of the ground. With the device coupled to a traction vehicle through the medium of the eye 20, it will be evident that the plow 70 will advance so as to sever the plants from their roots and cause the plants to be deposited on the conveyor belt 62 of the elevator. With the prime mover 28 in operation, and the brake band 106 tightened to the desired degree about the brake drum 36, it will be evident that the drum 90 and belt or apron 62 will be set into motion. With the implement advancing, and the severed plants being deposited on the elevator or conveyor belt 62, it will be evident that the plants will be moved upwardly and rearwardly of the implement and subsequently deposited into the hopper 40 in which they encounter the cutting teeth 114 of the drum and the cutting teeth 116 of the hopper so as to be ground into particles of a fineness to render them inert. After being ground, the ground product is discharged through the funnel 44 back onto the soil and may be mixed therewith as a fertilizer. In this way the undesired plant growth may be easily and quickly rendered inert so that even though it is immediately deposited in the soil no further growth of the ground plants will result.

While in the foregoing there has been shown and described the preferred embodiment of this invention it is to be understood that minor changes in the details of construction, combination and arrangement of parts may be resorted to without departing from the spirit and scope of the invention as claimed.

What is claimed is:

1. In a tractor drawn wheeled implement for destroying wild growth, a frame, traction wheels carried by said frame, a cutting blade adapted to be advanced beneath the surface of the ground for severing from their roots the plants to be destroyed, a hopper carried by the frame to the rear of and spaced from the cutting blade, an elongated upwardly and rearwardly inclined elevator carried by the frame immediately to the rear of the cutting blade for receiving the severed plants and discharging them into the hopper, adjustable means for maintaining said elevator taut, a drum mounted in the hopper for rotation about an axis which lies perpendicular to the path along which the blade is advanced, longitudinally spaced annular rows of cutting teeth carried by the drum and projecting outwardly from the periphery thereof, spaced rows of stationary cutting teeth carried by opposed walls of the hopper and projecting inwardly thereof between the rows of teeth on the drum, a prime mover carried by the frame between the cutting blade and the hopper, means connected to the drum and to the elevator for moving the elevator in unison with the rotation of the drum, a differential gear train connected to the prime mover and to the drum for establishing driving connection between the prime mover and the drum, a brake drum carried by the differential gear train which when held against rotation establishes driving connection between the prime mover and the drum, a brake band carried by the frame and encircling the brake drum for holding the brake drum against rotation, and means adjustably carried by the brake band and engaging the frame for regulating the frictional effort exerted by the brake band on the brake drum whereby said drum will stop when subjected to said excessive torsional strain.

2. In a tractor drawn vehicle of the character described and embodying a root cutting blade for severing roots or plants and a conveyor for conveying such roots and attached vegetation and soil to a point to be comminuted and separated, a comminuter comprising a hopper extending transversely of the vehicle adjacent its rear end, a circular drum journalled in said hopper for rotation on a horizontal axis and extending at right angles to the direction of movement of the vehicle, and rows of radially projecting cutting teeth extending about the periphery of said drum, such rows of teeth extending both circumferentially and axially of said drum, spaced rows of complementary stationary teeth carried by the walls of said hopper and projecting between the rows of cutting teeth on said drum to provide a multitude of cutting surfaces of smaller areas, additional rows of cleaning teeth carried by said hopper and having surfaces disposed contiguous of said cutting teeth on said drum for keeping such teeth free of excess undesirable material, a prime mover carried by the vehicle, a differential gear train connecting the rotatable drum and prime mover, a brake drum carried by said differential gear train, a brake band encircling said brake drum for rendering such gear train effective to drive said rotatable drum under predetermined conditions and to release such driving connection when the power required to operate said drum exceeds a predetermined maximum.

References Cited in the file of this patent

UNITED STATES PATENTS

| | | |
|---|---|---|
| 568,401 | Briggs | Sept. 29, 1896 |
| 838,655 | Sharp | Dec. 18, 1906 |
| 998,647 | Smith | July 25, 1911 |
| 1,018,513 | Meyer | Feb. 27, 1912 |
| 1,158,357 | Wood | Oct. 26, 1915 |
| 1,388,303 | Pulliam | Aug. 23, 1921 |
| 1,586,169 | Webb et al. | May 25, 1926 |
| 1,832,546 | Groop | Nov. 17, 1931 |
| 1,954,593 | Kuly | Apr. 10, 1934 |
| 2,170,360 | Whelan | Aug. 22, 1939 |
| 2,195,363 | Fegley et al. | Mar. 26, 1940 |
| 2,646,736 | Swartout | July 28, 1953 |